US006931523B1

(12) United States Patent
Tomoson et al.

(10) Patent No.: US 6,931,523 B1
(45) Date of Patent: Aug. 16, 2005

(54) SYSTEM AND METHOD FOR RE-STORING STORED KNOWN-GOOD COMPUTER CONFIGURATION VIA A NON-INTERACTIVE USER INPUT DEVICE WITHOUT RE-BOOTING THE SYSTEM

(75) Inventors: Patrick H. Tomoson, Dakota City, NE (US); James L. Kroening, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/457,841

(22) Filed: Dec. 9, 1999

(51) Int. Cl.$^7$ .............................................. G06F 1/24
(52) U.S. Cl. .............................. 713/100; 713/2; 714/7; 710/104
(58) Field of Search ................................ 713/1, 2, 100; 710/104, 10; 714/2, 3, 5–7; 711/162

(56) References Cited

U.S. PATENT DOCUMENTS

| 5,469,573 A | * | 11/1995 | McGill et al. ............... 717/127 |
| 5,613,135 A | | 3/1997 | Sakai et al. ................. 395/800 |
| 5,715,464 A | | 2/1998 | Crump et al. ............... 395/750 |
| 5,732,266 A | * | 3/1998 | Moore et al. ................... 713/1 |
| 5,745,669 A | * | 4/1998 | Hugard et al. ................. 714/3 |
| 5,754,798 A | | 5/1998 | Uehara et al. ............... 395/284 |
| 5,774,187 A | * | 6/1998 | Tsunoda ....................... 348/553 |
| 5,790,120 A | | 8/1998 | Lozares et al. ............. 345/349 |
| 5,838,307 A | | 11/1998 | Bouton ....................... 345/168 |
| 5,862,351 A | | 1/1999 | He ............................. 395/284 |
| 5,889,522 A | | 3/1999 | Chew et al. ................. 345/354 |
| 5,907,672 A | * | 5/1999 | Matze et al. .................... 714/8 |
| 6,052,793 A | * | 4/2000 | Mermelstein ............... 713/340 |
| 6,085,298 A | * | 7/2000 | Ohran ......................... 711/162 |
| 6,167,494 A | * | 12/2000 | Cheston et al. ............. 711/129 |
| 6,175,904 B1 | * | 1/2001 | Gunderson ................. 711/162 |
| 6,311,232 B1 | * | 10/2001 | Cagle et al. ................. 710/10 |
| 6,389,556 B1 | * | 5/2002 | Qureshi ....................... 711/112 |
| 6,434,696 B1 | * | 8/2002 | Kang ............................. 713/2 |
| 6,529,966 B1 | * | 3/2003 | Willman et al. ............. 710/10 |

(Continued)

FOREIGN PATENT DOCUMENTS

EP              636972 A1  *  2/1995   .......... G06F 9/445

(Continued)

OTHER PUBLICATIONS

Brian Ward—The Linux Kernel HOWTO—Dec. 22, 1994—comp.os.linux.answers, comp.os.linux.development.system, comp.os.linux.setup.*

(Continued)

*Primary Examiner*—Thuan Du
(74) *Attorney, Agent, or Firm*—Nathan Grebasch; Suiter-West-Swantz

(57) ABSTRACT

The invention includes a method of providing a known-good configuration for a computer, comprising storing a known-good computer configuration and restoring the known-good configuration via non-interactive user input. The configuration includes in various embodiments hardware and software configuration parameters. The known-good configuration is stored in some embodiments in computer storage such as a hard disc drive, and is loaded from storage upon restoration of the configuration. The non-interactive user input of some embodiments is a protected switch, hot key combination of keyboard keys, or is a special-purpose key or switch. The configuration is determined to be a known-good configuration to be stored in various embodiments by user determination that a configuration is good, by computer determination that the configuration is good based on a predetermined period of successful computer operation, or via other similar methods that suggest a proper configuration.

17 Claims, 2 Drawing Sheets

U.S. PATENT DOCUMENTS 6,543,004 B1 * 4/2003 Cagle et al. .................. 714/15

FOREIGN PATENT DOCUMENTS

JP          10091511 A  *  4/1998  .......... G06F 12/00

OTHER PUBLICATIONS

MrAbbott—CZ1000 P Button—Mar. 6, 1995—rec.music.makers.synth.*

Andrew S. Gianni—CZ1000 Internal Battery—Mar. 1, 1995—rec.music.makers.synth.*

Paul Hinsberg—"Last Known Good Configuration"—Dec. 8, 1997—Newsgroups:microsoft.public.windowsnt.domain.*

Les Seagren—"16 Bit Sound Problems"—Dec. 22, 1994—Newsgroups: rec.aviation.simulators.*

* cited by examiner

SYSTEM AND METHOD FOR RE-STORING STORED KNOWN-GOOD COMPUTER CONFIGURATION VIA A NON-INTERACTIVE USER INPUT DEVICE WITHOUT RE-BOOTING THE SYSTEM

FIELD OF THE INVENTION

The invention relates generally to configuring personal computers, and more specifically to backing up and restoring computer configurations.

BACKGROUND OF THE INVENTION

Each time new hardware or software is installed in a personal computer, a variety of configuration parameters are likely to be installed or changed. Often, hardware configuration files must be updated, new device driver files must be loaded and configured, and new shared library software files must be installed or updated. Occasionally, an attempt to install new hardware or software will result in installation of new software files or configuration of the system in a manner that causes the computer to function improperly. This can be the result of incompatible driver files, misconfigured hardware or software, or a variety of other problems that are usually difficult to diagnose.

Installation of new hardware into a computer system typically requires extensive modification to the computer system's software configuration. For example, addition of a new hardware device in Microsoft Windows 98 may require addition or change to win.sys and win.ini files, addition of hardware-specific driver software, changes to the autoexec.bat and config.sys files, and changes to the hardware configuration list. The hardware configuration list further includes hardware parameters such as interrupt request (IRQ) settings, direct memory access (DMA) settings, reserved address space settings and other hardware configuration settings. If any of these settings are incorrect or interfere with another device, the misconfiguration may cause the computer to operate improperly and unpredictably.

Incompatibilities resulting from installation or configuration of new software can be just as problematic and difficult to diagnose, as proper software operation often relies on a particular configuration of the operating system and presence of needed files. Software installed in Windows 98, for example, typically creates several entries in the Microsoft Windows registry, and may also modify several initialization (INI) files such as the win.ini file or secondary INI files.

When an incompatibility is discovered, the computer user is often left to experiment with the system settings, try reinstalling selected software, or to uninstall suspected offending software. Experimenting with the system settings requires a knowledge of what is causing the problem and what system settings must be changed to a specific value to fix the problem, and so is not a practical solution for many unsophisticated users. Reinstalling selected software may fix the problem, but may also only serve to reinstall or reconfigure the computer to the same improper state. Uninstalling software is difficult and unreliable in operating systems such as Windows, as the Windows uninstall utility does not account for changes to the computer configuration subsequent to installation of the software being uninstalled. Software installed after the software being uninstalled may therefore have to be reinstalled, creating a great deal of work for the user. Also, uninstallation may prompt a user to delete dynamic link library (DLL) files which the operating system mistakenly believes are not used by other programs, but which are needed by other software. This again requires reinstallation of the software that requires use of the missing DLL file, further complicating the process.

Software exists that allows a user to save a record of various system configuration parameters so that they can be restored should the machine become inoperable. One such software product is PictureTaker by Lanovation. Such software allows a user to also log changes made to the system configuration since the last record was made, so that a complete record need not be taken every time the system configuration changes. Therefore, if a change in system configuration occurs such as from installation of new hardware or software and the change causes the machine to operate improperly, the PictureTaker software allows the user to restore the system configuration to a previous state that is believed to be good.

But, such software requires booting the operating system and executing the PictureTaker program to restore a good system configuration which may not be possible if the improper system configuration doesn't allow the operating system to fully boot. Also, a user may not execute software that requires manual backing up and restoring of configurations regularly enough to ensure that a desired good configuration is stored. Therefore, a more user-friendly method of backing up and restoring system configuration is desired.

SUMMARY OF THE INVENTION

One embodiment of the invention includes a method of providing a known-good configuration for a computer, comprising storing a known-good computer configuration and restoring the known-good configuration via non-interactive user input. The configuration includes in various embodiments hardware and software configuration parameters. The known-good configuration is stored in some embodiments in computer storage such as a hard disc drive, and is loaded from storage upon restoration of the configuration. The non-interactive user input of some embodiments is a protected switch, hot key combination of keyboard keys, or is a special-purpose key or switch. The configuration is determined to be a known-good configuration to be stored in various embodiments by user determination that a configuration is good, by computer determination that the configuration is good based on a predetermined period of successful computer operation, or via other similar methods that suggest a proper configuration.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention improves on the prior art by providing a non-interactive user input that when actuated causes the computer to restore a known-good configuration. Such a system allows not only easy restoration of good system configurations, but provides the capability to restore a system configuration without fully booting an operating system. By simply pressing a button or key, a known-good configuration can be restored and return such a system to an operable condition.

Figure 1:
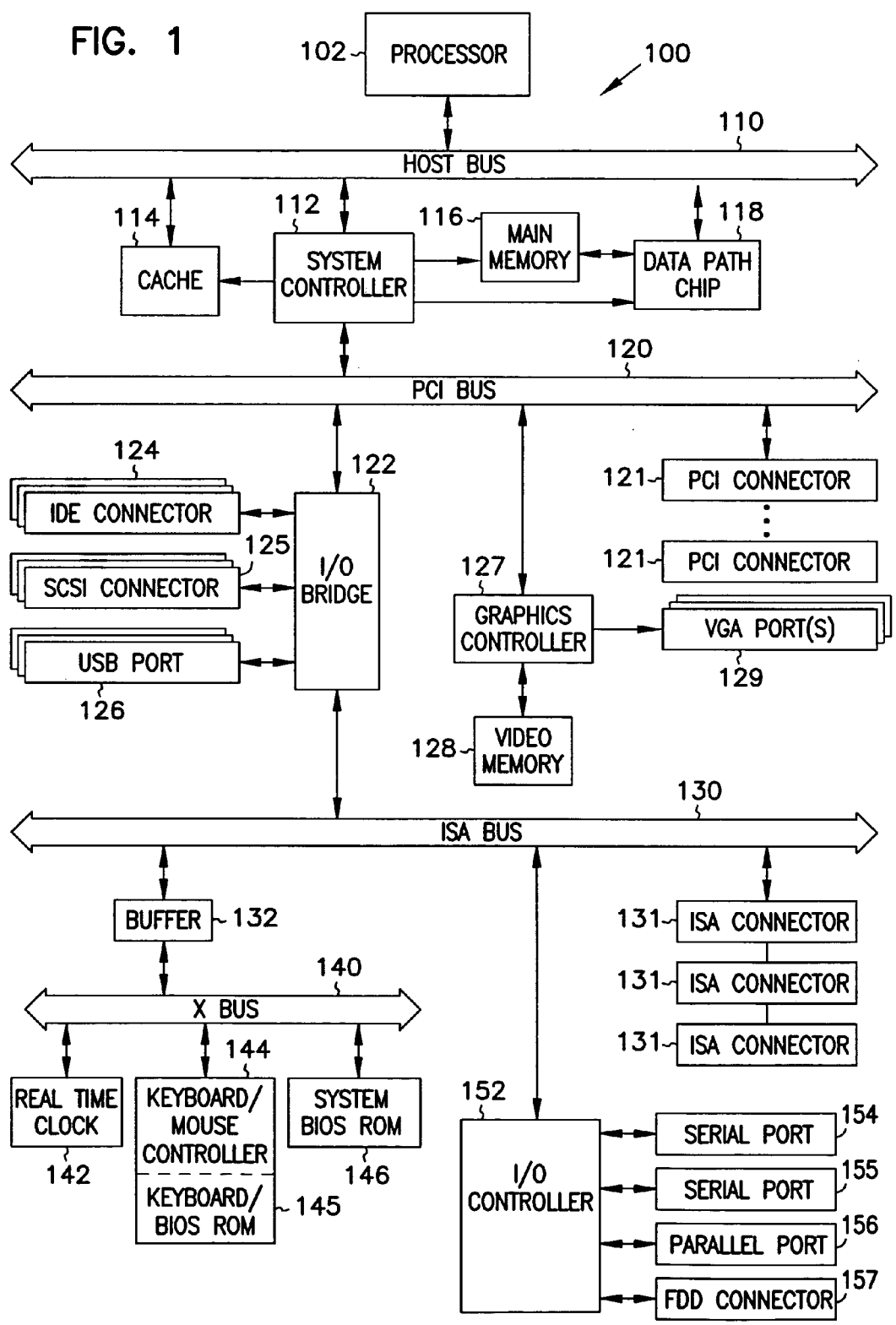
FIG. 1 shows a computer system as may be utilized to practice an embodiment of the present invention.

FIG. 1 illustrates a general-purpose personal computer system 100, such as the invention may be practiced on. In this embodiment, processor 102, system controller 112, cache 114, and data-path chip 118 are each coupled to host bus 110. Processor 102 is a microprocessor such as a 486-type chip, a Pentium®, Pentium II® or other suitable microprocessor. Cache 114 provides high-speed local-memory data (in one embodiment, for example, 512 kB of cache memory) for processor 102, and is controlled by system controller 112, which loads cache 114 with data that is expected to be used soon after the data is placed in cache 112 (i.e., in the near future). Main memory 116 is coupled between system controller 114 and data-path chip 118, and in one embodiment, provides random-access memory of between 16 MB and 128 MB of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding many of the other components shown in FIG. 1. Main memory 116 includes standard DRAM (Dynamic Random-Access Memory), EDO (Extended Data Out) DRAM, SDRAM (Synchronous DRAM), RDRAM (Rambus DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHZ. In another embodiment, PCI bus 120 provides a 64-bit-wide data path that runs at 33 MHZ. In yet other embodiments, PCI bus 120 provides 32-bit-wide or 64-bit-wide data paths that runs at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129. VGA port 129 can connect to industry-standard monitors such as VGA-type, SVGA (Super VGA)-type, XGA-type (extended Graphics Adaptor) or SXGA-type (Super XGA) display devices. Other input/output (I/O) cards having a PCI interface can be plugged into PCI connectors 121.

In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 1 shows one exemplary embodiment of a computer system that may be used with the present invention, however other bus structures and memory arrangements are specifically contemplated and are within the scope of the invention.

Figure 2:
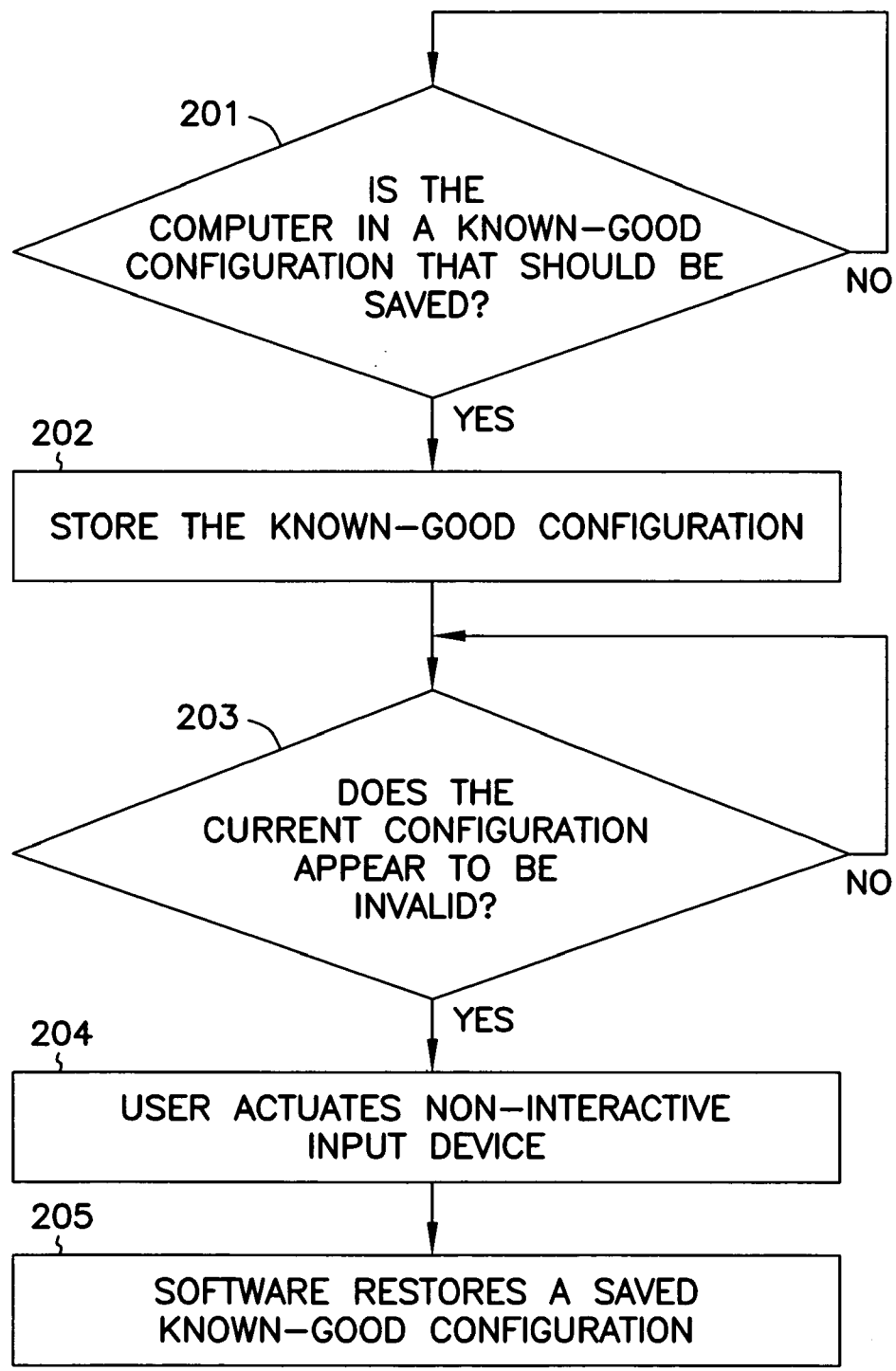
FIG. 2 is a flowchart diagram, consistent with an embodiment of the present invention.

FIG. 2 illustrates a flowchart of one embodiment of the invention, and illustrates the manner in which various components of the invention function. The flowchart broadly shows the interaction between components in various embodiments of the invention, and provides a context in which the various embodiments may be understood.

First, a known-good configuration must be stored. This involves configuration and operation of a computer to ensure that the computer is configured and properly operational. Initial configuration is typically performed by a computer system manufacturer, and subsequent modifications to computer configuration are often made by computer users. For purposes of this patent document, a known-good configuration need not be guaranteed valid, but must merely be a configuration which has been determined by some method to be likely to be a proper configuration.

At 201, it is determined whether the current computer configuration is known to be valid. If the configuration is determined to be a good configuration that should be saved, the known-good configuration is saved at 202. The configuration can be determined to be a known-good configuration based on evaluation of at least one of a number of criteria that may indicate that the current configuration is proper. For example, a user can determine that the present configuration is valid based on observation of the computer system in operation, and manually initiate saving the configuration. Alternatively, software can automatically determine that the present configuration appears sufficiently stable to qualify as a known-good configuration, and store the configuration. The software may determine the present configuration is valid based on a specific number of different applications executed, on a specific amount of time of proper operation since the last configuration change, on a specific amount of successful executions of any application, or on other criteria that may indicate proper configuration.

But, a configuration that is determined to qualify as a known-good configuration may not be saved in some embodiments. For example, a configuration determined to be valid based on a predetermined number of successful operating system boot cycles may not be saved if the same computer system has already saved the present configuration based on other criteria such as a predetermined number of successful application executions. In some embodiments, the user may also be prompted to approve saving a new known-good configuration, and may be notified of the basis for determination that the current configuration has qualified as known good. One example is a determination that a current configuration is known good and should be backed up based on installation or configuration of new software. The user may believe the current configuration is improper, which is the reason new software is being installed, and so elect not save the present configuration.

Once the configuration has been determined to be a known-good configuration that should be saved at 201, it is saved at 202. Saving the configuration may be done by special-purpose software, or by commercial software such as PictureTaker by Lanovision. PictureTaker is one example of commercial software that saves files known as packages that represent a wide variety of user settings, device drivers, registry settings, Microsoft Windows settings, and other configuration data. The saved configuration can then be restored to the system in the event of an apparent configuration problem via the PictureTaker software. The PictureTaker software is executed under Microsoft Windows, and so requires successful booting of Windows to operate, making it useful for backing up files but not as versatile for restoring files as the non-interactive input triggered configuration restore of the present invention.

The known-good configuration may be stored on any device or medium that is capable of storing the configuration data such that it can later be retrieved during a restore operation. Examples of such devices include hard disk drives, diskettes, CD or DVD ROM discs, networked computers, and removable storage such as Zip or Jazz-brand drives. Some embodiments store the configuration data in special protected or hidden partitions or files, such as a hidden partition or directory on a hard disk drive. Also, the configuration data may be stored on special portions of a hard disk drive that are not accessible by users using disk partitioning or formatting utilities but are generally reserved by disk manufacturers to store disk-specific data such as defect lists and manufacturing data.

The configuration data is stored in a compressed format in some embodiments to conserve storage space, and in some embodiments is stored as an incremental configuration change record also to conserve storage. Storage of an incremental configuration change comprises storing a record of that configuration information which has changed since the last full configuration save, thereby requiring less storage space than a fill configuration storage.

The configuration includes data representing the computer hardware configuration, the configuration of software on the computer, or both. Any changeable setting affecting the operation of the computer falls within the definition of configuration, and should be considered a configuration parameter for purposes of this application. As an example, hardware configuration in a personal computer system such as is shown in FIG. 1 may consist of parameters such as the Plug and Play (PNP) hardware configuration list, desktop management interface (DMI) data, address space data, Interrupt ReQuest (IRQ) data, Direct Memory Access (DMA) data, and other types of hardware configuration data. Software configuration may include operating system files, including Microsoft Windows .ini initialization files, .sys system files, and hardware device driver files. The software configuration in various embodiments also includes data related to the parameters described as hardware configuration parameters, as they may be utilized or even controlled by the operating system software. It is anticipated that computer systems will have a variety of configurable parameters other than those parameters described here with respect to the exemplary personal computers executing Microsoft Windows, all of which are to be considered within the scope of the definition of configuration and within the scope of the invention.

Once the configuration has been stored, the user operates the computer until the computer appears to be configured improperly. The invention in some embodiments provides the user the ability to restore a stored known-good configuration by actuating a non-interactive user interface device such as a switch. Actuation of the interface device causes software executing on the computer to load the known-good configuration from storage and restore it to the computer system. At 203, it is determined whether the computers present configuration appears to be improper. If the present configuration is determined to be improper, the user initiates a restore of a stored known-good configuration by actuating a non-interactive user input device at 204. If the present configuration is not determined to be improper, the user simply continues using the computer until such time as a configuration problem may develop.

The non-interactive user input device of the invention in one embodiment is a user input device that does not require use of a graphical user interface or other graphical representation to function. For example, while other systems may require loading an operating system and executing a program within a graphical user interface of the operation to execute, the present invention relies upon a non-interactive input device such as a switch to trigger restoration of the known-good configuration. The non-interactive user interface in some embodiments is a protected switch such as may be actuated via a probe such as a bent paper clip, is a special key on a keyboard, is a hotkey combination of standard keys on a keyboard, or is a switch that is electrically connected to the computer system. Other non-interactive devices may be utilized that can be actuated without visual indication or interaction with software, and are within the scope of non-interactive input devices consistent with the invention.

Use of a non-interactive device to initiate restoration of a known-good configuration allows restoration of a known-good configuration in instances where a computer system is not able to fully load an operating system and provide a graphical user interface to support other methods. The known-good configuration that is restored, however, may be selected in some embodiments from all the stored known-good configurations via a graphical user interface or other software interaction that permits a user to choose from a list when possible. But, when the operating system is unable to boot fully, some embodiments will still provide the ability to restore a known-good configuration without a visual display.

Actuation of the non-interactive input device causes software executing on the computer system to restore a known-good configuration from among the stored known-good configurations at 205. The software in some embodiments comprises software that is loaded before the graphical user interface of Microsoft Windows is fully loaded, and can be triggered before the operating system is fully loaded to initiate restoration of a known-good configuration. Software restoration of a known-good configuration may be achieved by an interface between the non-interactive user input device and commercial software such as PictureTaker by Lanovision, or via any other implementation that results in restoration of a known-good configuration as a result of actuation of the non-interactive input device. All such embodiments are consistent with the present invention, and are within the scope of the invention.

After a known-good configuration is restored at 205, the user operates the computer with the restored configuration, and may choose to try to determine the cause of the improper configuration. Although determination of what caused a configuration to appear to be improper is beyond the scope of this application, the present invention may be used to restore a computer to an operable state so that a user can perform various tests or experiments to determine how to correct a configuration problem.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A method of providing a known-good configuration for a computer, comprising:
   storing a known-good computer configuration consisting essentially of at least one of hardware configuration parameters or software configuration parameters; and
   restoring the known-good configuration via non-interactive user input
   receiving an indication that the non-interactive user input has been actuated;
      wherein the restoring the known-good configuration is based on said indication, wherein the restoring the known good configuration is operable without rebooting the computer.

2. The method of claim 1, wherein the non-interactive user input is selected from the group consisting of a protected switch, a switch, a hotkey, a key combination, and a special-purpose keyboard key.

3. The method of claim 2, wherein the known-good configuration comprises hardware configuration.

4. The method of claim 3, wherein the hardware configuration comprises at least one configuration component selected from the group consisting of address space data, IRQ data, DMA data, DMI data, and plug and play hardware configuration data.

5. The method of claim 2, wherein the known-good configuration comprises software configuration.

6. The method of claim 5, wherein the software configuration comprises at least one configuration component selected from the group consisting of .sys file data, .ini file data, operating system configuration data, Microsoft Windows registry data, and hardware device driver files.

7. The method of claim 1, wherein storing the known-good computer configuration comprises storing an incremental configuration that comprises those changes made to the configuration since a previous stored configuration.

8. The method of claim 1, wherein storing the known-good configuration comprises storing the configuration on at least one device selected from the group consisting of a hard disk drive, a diskette, a network server, and a hard disk protected area.

9. A machine-readable medium with instructions stored thereon, the instructions when executed are operable to cause a computer to:
   store a known-good computer configuration consisting essentially of at least one of hardware configuration data or software configuration data; and
   restore the known-good configuration via a non-interactive input;
   receive an indication that the non-interactive user input has been actuated,
   wherein the restoring the known-good configuration is based on said indication,
   wherein the known-good configuration is operable without rebooting the computer.

10. The machine-readable medium of claim 9, wherein the non-interactive user input is selected from the group consisting of a protected switch, a switch, a hotkey, a key combination, and a special-purpose keyboard key.

11. The machine-readable medium of claim 10, wherein the non-interactive user input consists of an actuation of a single switch or key, or a simultaneous key combination of the computer.

12. The machine-readable medium of claim 10, wherein the non-interactive user input does not require user entry of information or interfacing with a graphical representation to function.

13. A method of restoring a known-good configuration on a computer, comprising actuating a non-interactive user input that causes software executing on the computer to restore a known-good configuration consisting essentially of at least one of a hardware configuration data and software configuration data,
   wherein the non-interactive user input is selected from the group consisting of a protected switch, a switch, a hotkey, a key combination, and a special-purpose keyboard key,
   wherein the known-good configuration is operable without rebooting the computer.

14. A method of providing an updated known-good configuration for a computer, comprising:
   determining an updated combination configuration consisting essentially of at least one of software or hardware is a known-good configuration for the computer;
   storing the determined known-good updated combination configuration to a known-good data storage device;
   receiving a non-interactive user input for restoration of the computer to a known-good combination configuration; and
   restoring the known-good updated combination configuration upon reception of the non-interactive user input,
   wherein restoration of the known-good updated combination configuration is restored without rebooting the computer.

15. The method of claim 14, wherein the non-interactive user input is at least one of a single switch, a key, and a simultaneous key combination.

16. The method of claim 15, where the non interactive user input does not require user entry of information or interface with a graphical user interface.

17. The method of claim 14, wherein a known-good storage device is a hard drive.

* * * * *